United States Patent [19]

Shimamura

[11] 4,163,906
[45] Aug. 7, 1979

[54] TIME DIVISION SWITCHING REGULATOR

[75] Inventor: Hironori Shimamura, Yokohama, Japan

[73] Assignee: Nippon Electronics Memory Industry Co., Ltd., Tokyo, Japan

[21] Appl. No.: 827,343

[22] Filed: Aug. 24, 1977

[30] Foreign Application Priority Data

Aug. 25, 1976 [JP] Japan .................................. 51-100505

[51] Int. Cl.² ............................................. H02P 13/26
[52] U.S. Cl. ........................................ 307/39; 307/41; 307/34; 307/151; 303/71; 363/97
[58] Field of Search ...................... 307/11, 151, 31, 34, 307/41, 39; 323/16, 17, 18, 19, 22 T, 22 Z, 25, 26, 38; 363/37, 71, 97

[56] References Cited

U.S. PATENT DOCUMENTS

| | | | |
|---|---|---|---|
| 3,577,063 | 5/1971 | Hurd | 323/16 |
| 4,010,412 | 3/1977 | Forman | 323/25 |
| 4,025,863 | 5/1977 | Higuchi | 363/97 |
| 4,062,057 | 12/1977 | Perkins | 363/71 |

Primary Examiner—L. T. Hix
Assistant Examiner—S. D. Schreyer
Attorney, Agent, or Firm—Burgess, Ryan and Wayne

[57] ABSTRACT

A time division switching regulator wherein a single power source is connected to a plurality of inverters the outputs from which are rectified and smoothed and appear at respective output terminals, and the output voltages at said terminals are sequentially monitored and are compared with a reference voltage to generate an error signal in response to which the output from the corresponding inverter may be controlled or regulated.

12 Claims, 12 Drawing Figures

ACTIVATING CIRCUIT

TIME DIVISION SWITCHING REGULATOR

BACKGROUND OF THE INVENTION

The present invention relates to a time division switching regulator which may be used as a multichannel power source.

With recently greatly developed one-chip central processing units, microcomputers have been made more compact in size and lighter in weight. These microcomputers require a plurality of power sources or a multichannel power source. The multichannel power sources may be generally divided into two types. In one type called a dropper system, a single AC power source is connected to a plurality of rectifiers while in the other type called a switching system there is provided a plurality of inverters each consisting of switching transistors. The dropper system is in general large in size and heavy in weight because of a heavy power transformer so that even though the essential components of the microcomputers have been made extremely compact in size and light in weight, the microcomputers themselves cannot be made compact in size and light in weight. In both the dropper and switching systems, a stabilization circuit must be inserted between an output terminal and a power transformer or inverter so that the overall circuitry is complex in construction and very expensive to fabricate.

In order to solve these problems, there has been devised and demonstrated an improved switching system wherein a single pair of switching transistors is coupled to a plurality of secondaries of a transformer, and in response to the output voltage across output terminals of one of a plurality of output circuits connected to said plurality of secondaries respectively, said single pair of switching transistors is controlled. However, this improved switching system is not successful in stabilizing the output voltages against the variation in load, ripples and so on.

SUMMARY OF THE INVENTION

Accordingly, one of the objects of the present invention is to provide a time division switching regulator which is very simple in construction yet very effective in stabilizing all of the output voltages.

Another object of the present invention is to provide a time division switching regulator wherein a detector having a reference voltage preset therein detects the errors of a plurality of output voltages, thereby regulating the output voltages.

To the above and other ends, the present invention provides a time division switching regulator comprising a plurality of inverters connected to a common power source, a plurality of output terminals for rectifying and smoothing the outputs from said inverters, a detector circuit for sequentially monitoring the output voltages and comparing the output voltage with a reference voltage to generate an error signal, and a control circuit responsive to said error signal for sequentially controlling or regulating the inverters.

BRIEF DESCRIPTION OF THE DRAWINGS

Same reference numerals are used to designate similar parts throughout the figures.

DESCRIPTION OF THE PREFERRED EMBODIMENTS

Prior Art, FIGS. 1-4

Prior to the description of the preferred embodiments of the present invention, some prior art systems will be briefly described in order to more specifically point out their problems.

Figure 1:
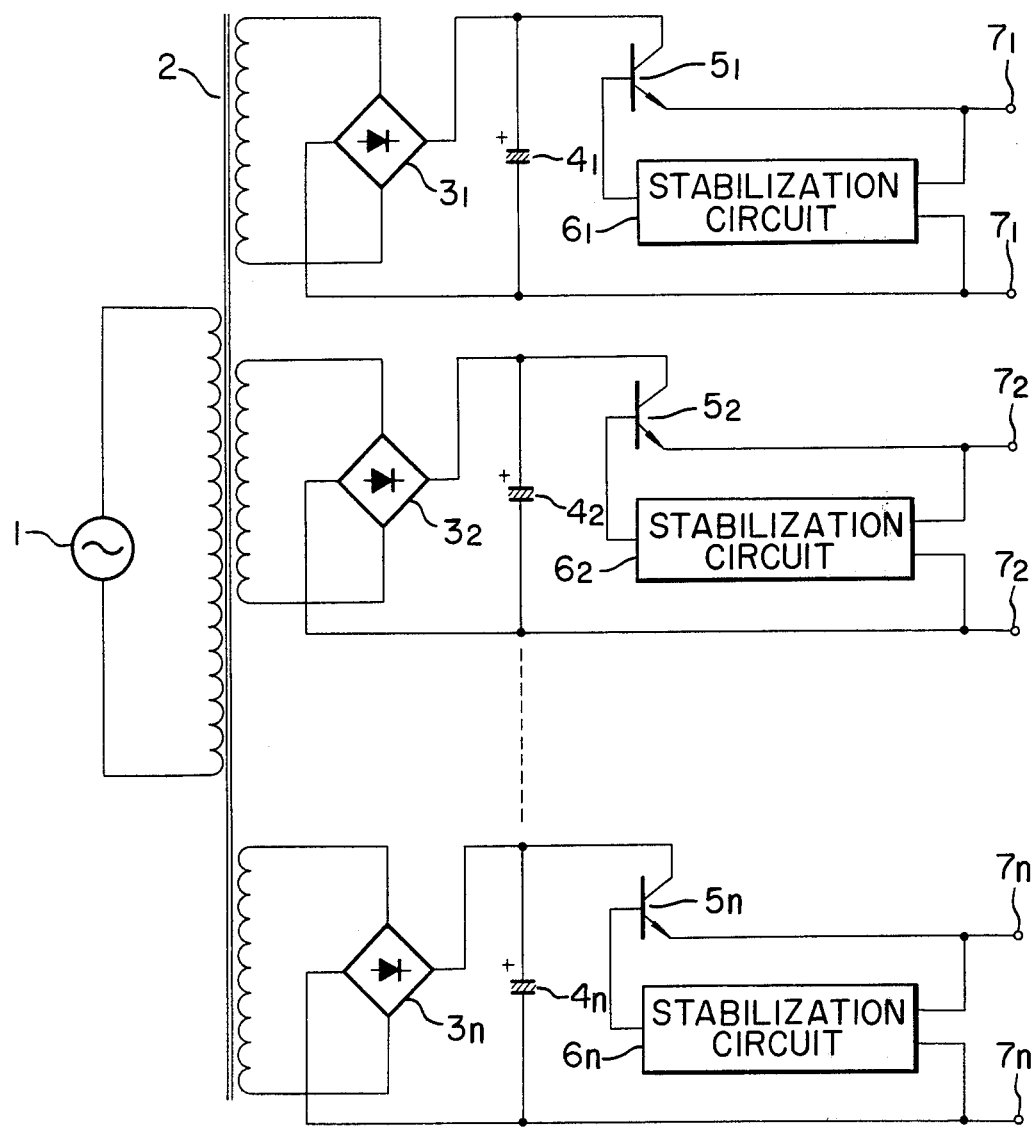
FIG. 1 is a diagram of a prior art dropper type multichannel power source.

First referring to FIG. 1 showing a prior art dropper system or a serial control system, an AC source 1 is connected to a primary of a commercial frequency transformer 2 having a plurality of secondaries connected through a plurality of rectifiers $3_1$-$3_n$ and a plurality of capacitors $4_1$-$4_n$ both equal in number to the secondaries of the transformer 2 to a plurality of serial control transistors or boosters $5_1$-$5_n$ which in turn are connected to control or stabilization circuits $6_1$-$6_n$ and output terminal pairs $7_1$-$7_n$.

Figure 2:
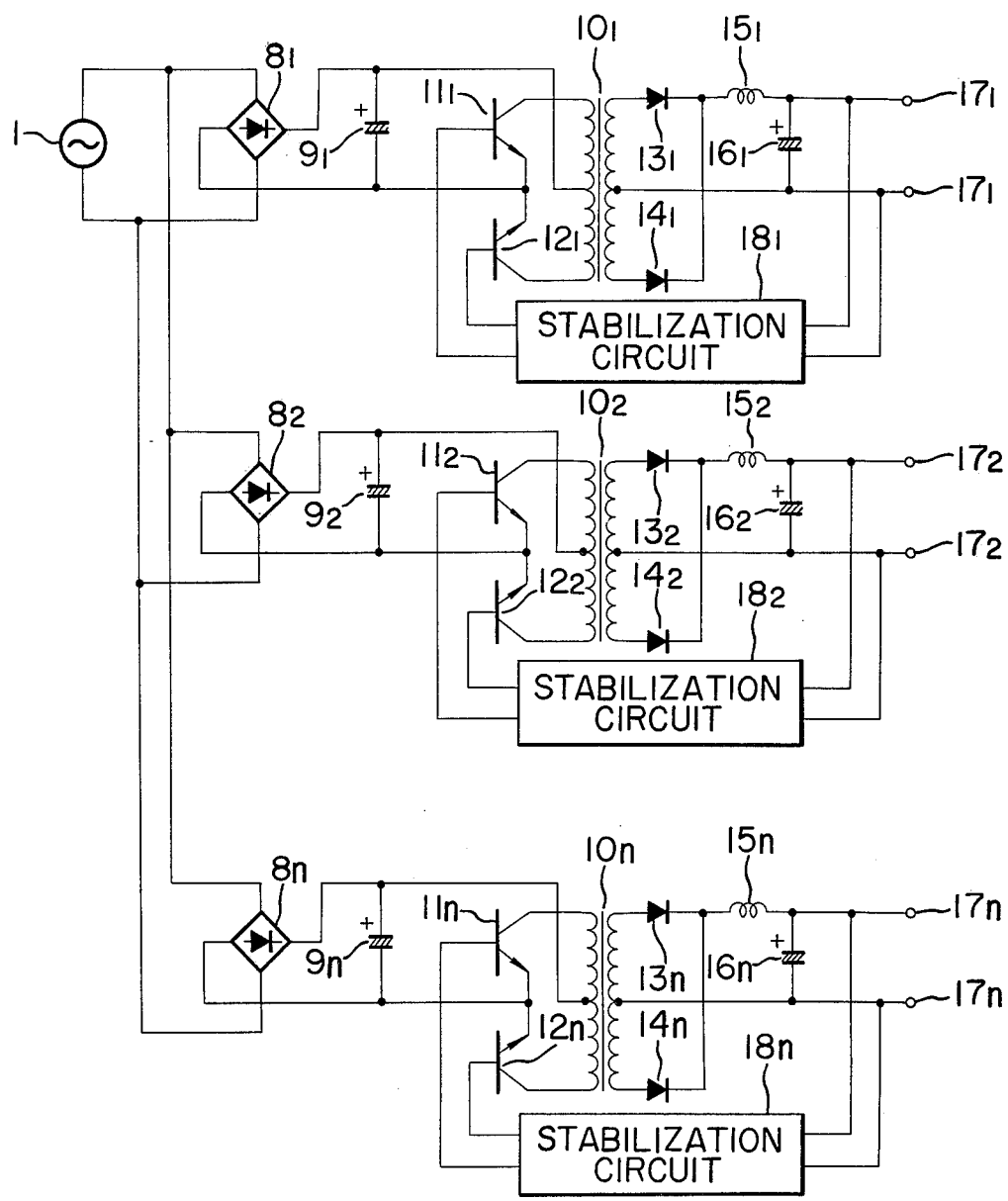
FIG. 2 is a circuit diagram of a switching type multichannel power source.

In a prior art switching system shown in FIG. 2, the AC source 1 is connected through rectifiers $8_1$-$8_n$ and capacitors $9_1$-$9_n$ to the center taps of high frequency transformers $10_1$-$10_n$ and to the emitters of power switching transistor pairs $11_1$ and $12_1$-$11_n$ and $12_n$. The secondaries of the transformers $10_1$-$10_n$ are connected through high-frequency power diode pairs $13_1$ and $14_1$-$13_n$ and $14_n$, choke coils $15_1$-$15_n$ and capacitors $16_1$-$16_n$ to output terminal pairs $17_1$-$17_n$. The output terminal pairs $17_1$-$17_n$ are connected through control or stabilization circuits $18_1$-$18_n$ to the bases of the power transistor pairs $11_1$ and $12_1$-$11_n$ and $12_n$.

In both the dropper or serial control system shown in FIG. 1 and the switching system shown in FIG. 2, each output circuit includes the control or stabilization circuit. In the system shown in FIG. 1 the serial control power transistors equal in number to the outputs are required while in the switching system shown in FIG. 2 the inverters equal in number to the outputs are required. As a result, both the systems are very complex in contruction and expensive to fabricate.

Figure 3:
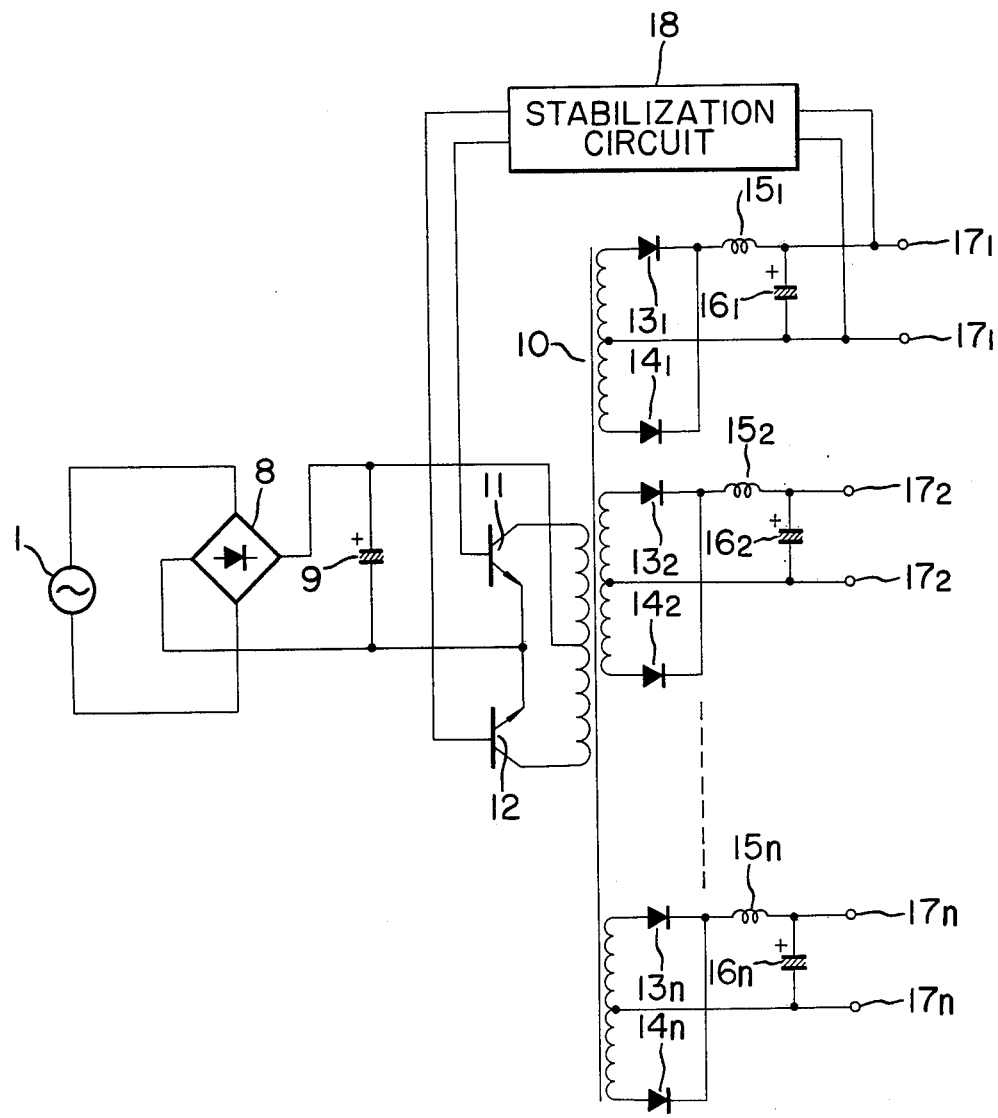
FIGS. 3 and 4 are circuit diagrams of the modifications, respectively, of the multichannel power source shown in FIG. 2.

In order to solve these problems, there has been devised and demonstrated a system of the type shown in FIG. 3 wherein the AC power source 1 is connected to one rectifier 8, one capacitor 9, one high-frequency transformer 10, one pair of power switching transistors 11 and 12 and one control or stabilization circuit 18. Each secondary of the high-frequency transformer 10 is connected through a pair of diodes $13_n$ and $14_n$, a choke coil $15_n$ and a capacitor $16_n$ to the output terminal $17_n$. However, the control circuit 18 is connected only to the output terminal $17_1$ so that the output derived from the terminal $17_1$ may be stabilized but the outputs derived from the terminals $17_2$–$17_n$ cannot be stabilized against the variation in load, ripples and so on.

Figure 4:
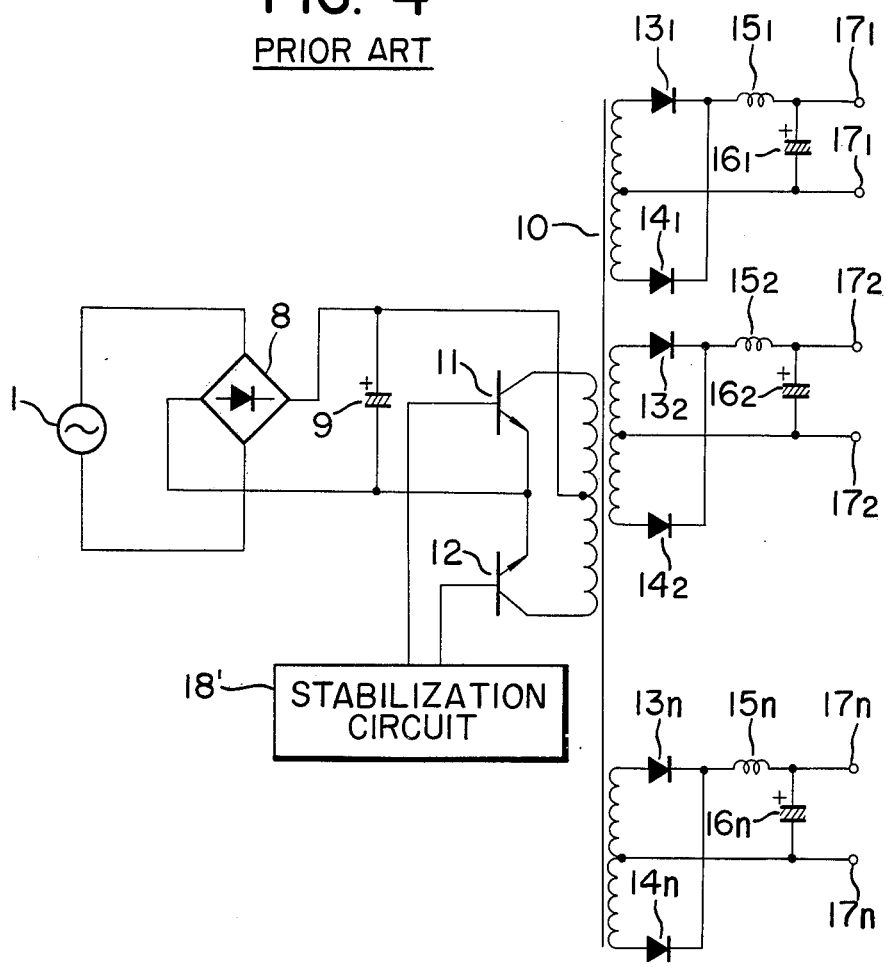

In FIG. 4 there is shown a prior art switching regulator wherein instead of the control circuit 18 shown in FIG. 3 there is provided a stabilization circuit 18' which stabilizes the input independently of the outputs. That is, no feedback is applied from the outputs to the input. However, this arrangement cannot eliminate the effects on the outputs of the variation in load, ripples and so on.

The Invention, FIGS. 5–12

Figure 5:
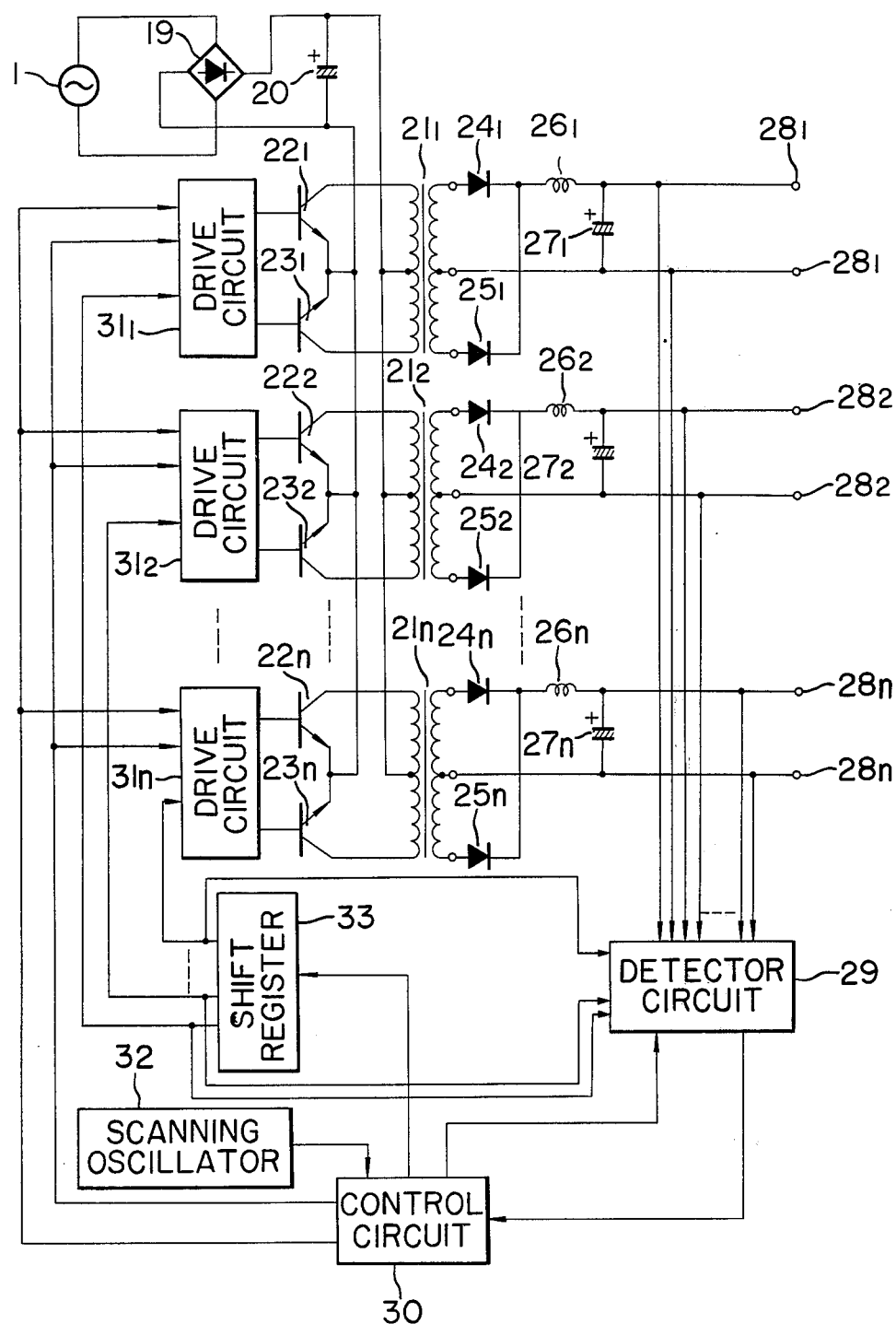
FIG. 5 is a circuit diagram of a time division switching regulator in accordance with the present invention.

In FIG. 5 there is shown one preferred embodiment of the present invention. The AC power source 1 is connected through a rectifier 19 and a capacitor to the center taps of primaries of high-frequency transformers $21_1$–$21_n$ and to the junctions between emitters of power switching transistor pairs $22_1$ and $23_1$–$22_n$ and $23_n$. The high-frequency transformer $21_n$ and the power switching transistor pairs $22_n$ and $23_n$ constitute an inverter. The secondaries of the high-frequency transformers $21_1$–$21_n$ are connected through diode pairs $24_1$ and $25_1$–$24_n$ and $25_n$, choke coils $26_1$–$26_n$ and capacitors $27_1$ through $27_n$ to output terminals $28_1$–$28_n$. Each diode pair $24_n$ and $25_n$, each choke coil $26_n$ and each capacitor $27_n$ make up a rectifier-smoothing circuit. The outputs derived from the terminal $28_1$–$28_n$ are applied to a detector circuit 29 which in turn is connected to a control circuit 30. The control circuit 30 is connected to a plurality of drive circuits $31_1$–$31_n$ which in turn are connected to the bases of the transistor pairs $22_1$ and $23_1$–$22_n$ and $23_n$ in the inverters. In order to drive the drive circuits $31_1$–$31_n$ in a time division manner, a scanning oscillator 32, the control circuit 30, the detector circuit 29 and a shift register 33 are interconnected. The outputs from the shift register 33 are applied to the input of the detector circuit 29.

Next the mode of operation will be described. AC current from the AC power source 1 is rectified by the rectifier 19, smoothed by the capacitor 20 and is used as a bias source for the inverters each consisting of the high-frequency transformer $21_n$ and the power transistor pairs $22_n$ and $23_n$. The output from each of the high-frequency transformers $21_1$–$21_n$ is rectified by the respective diode pairs $24_n$ and $25_n$, smoothed by the respective choke coil $26_n$ and capacitor $27_n$ and is derived from the respective output terminal $28_n$.

Next the mode of stabilizing the outputs will be described. Scanning pulses are applied from the scanning oscillator 32 to the control circuit 30 from which the scanning pulses are distributed to the detector circuit 29 and the shift register 33 so that the detector circuit 29 and the shift register 33 are operated in synchronism with each other. The detector circuit 29 sequentially scans the output voltages at the output terminals $28_1$–$28_n$ and compares the output voltage with a reference voltage set in the detector circuit 29 so that an error signal may be applied to the control circuit 30. The control circuit 30 in turn converts the error signal into a digital signal which is transmitted to the drive circuits $31_1$–$31_n$. Since the shift register 33 shifts the pulses from the control circuit 30 by one bit, only the drive circuit $31_n$ which has received the pulse from the shift register 33 is activated to stabilize the output voltage at the corresponding output terminal $28_n$. In like manner, the output voltages at the terminals $28_1$–$28_n$ are stabilized sequentially, and the contents in the shift register 33 returns to the initial contents so that the output voltages at the terminals $28_1$–$28_n$ are sequentially stabilized again.

Figure 6:
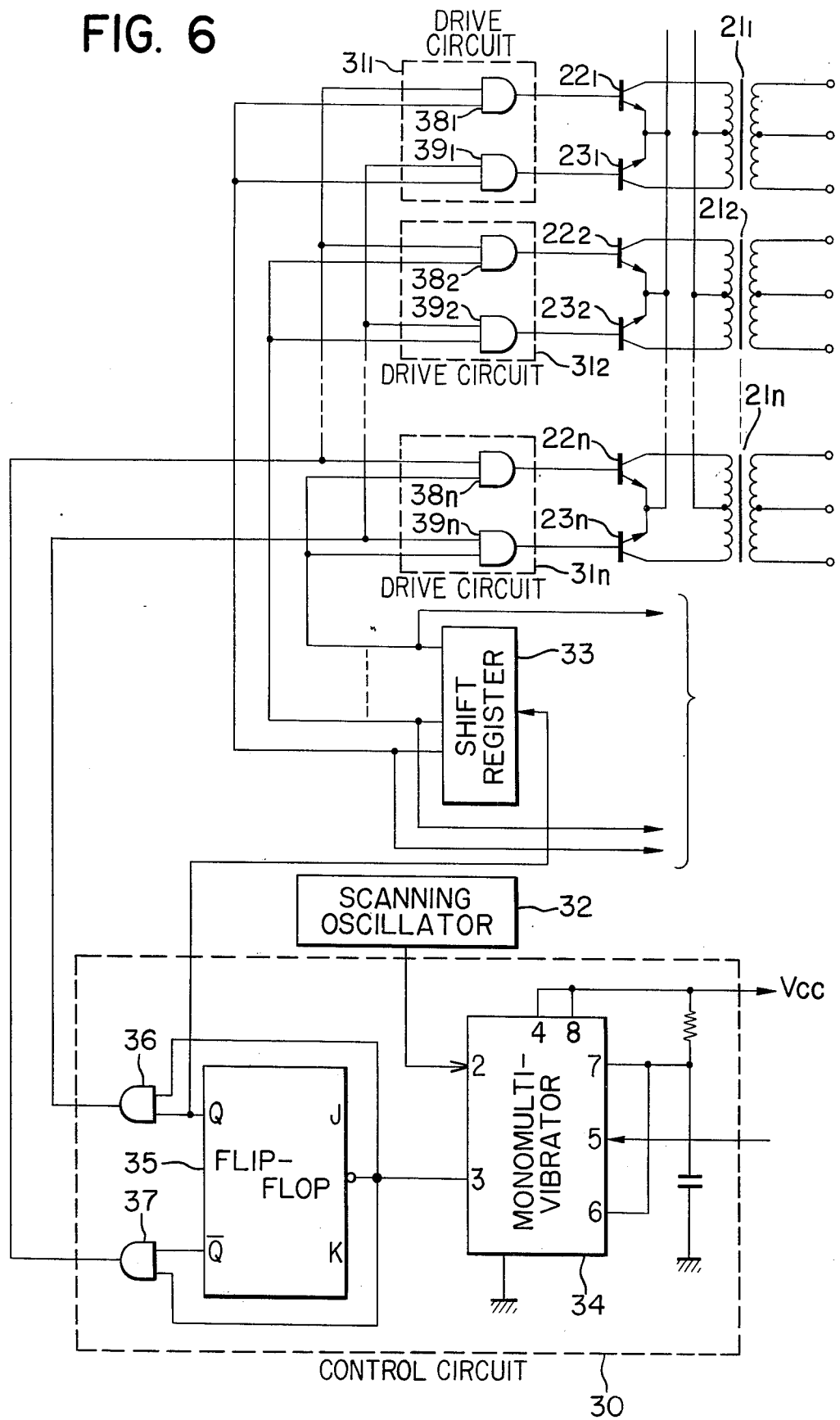
FIG. 6 is a detailed diagram of inverters, a control circuit, drive circuits, an oscillator and a shift register.

The individual circuits will be described in detail with reference to FIGS. 6–12. In FIG. 6 there is shown a detailed diagram of the control circuit 30 comprising a monomultivibrator 34, a flip-flop 35 and two AND gates 36 and 37. The pulses from the scanning oscillator 32 are transmitted through the monomultivibrator 34 and the flip-flop 35 to the shift register 33 the output of which is transmitted to the detector circuit 29 for synchronized operation with the inverters. The error signal from the detector circuit 29 is converted by the monomultivibrator 34 into a positive pulse signal the pulse width of which represents the degree of an error between the reference voltage and the scanned output voltage, and the pulse signal is transmitted to the flip-flop 35 and to AND gates 36 and 37. The output derived from the terminal Q of the flip-flop 35 is applied to the shift register 33 and is derived not from AND gate 37 but from AND gate 36 and is applied to AND gates $39_1$–$39_n$ in the drive circuits $31_1$–$31_n$. The output is derived only from AND gate $38_n$ to which is also applied simultaneously the pulse from the shift register 33. When the flip-flop 35 reverses its state so that the output is derived from the terminal Q, the output is transmitted through AND gate 37 to AND gates $38_1$–$38_n$ in the drive circuits $31_1$–$31_n$. Since the output from the shift register has not yet shifted, only the drive circuit $31_n$ which has received the pulse signal from the shift register is activated.

Figure 7:
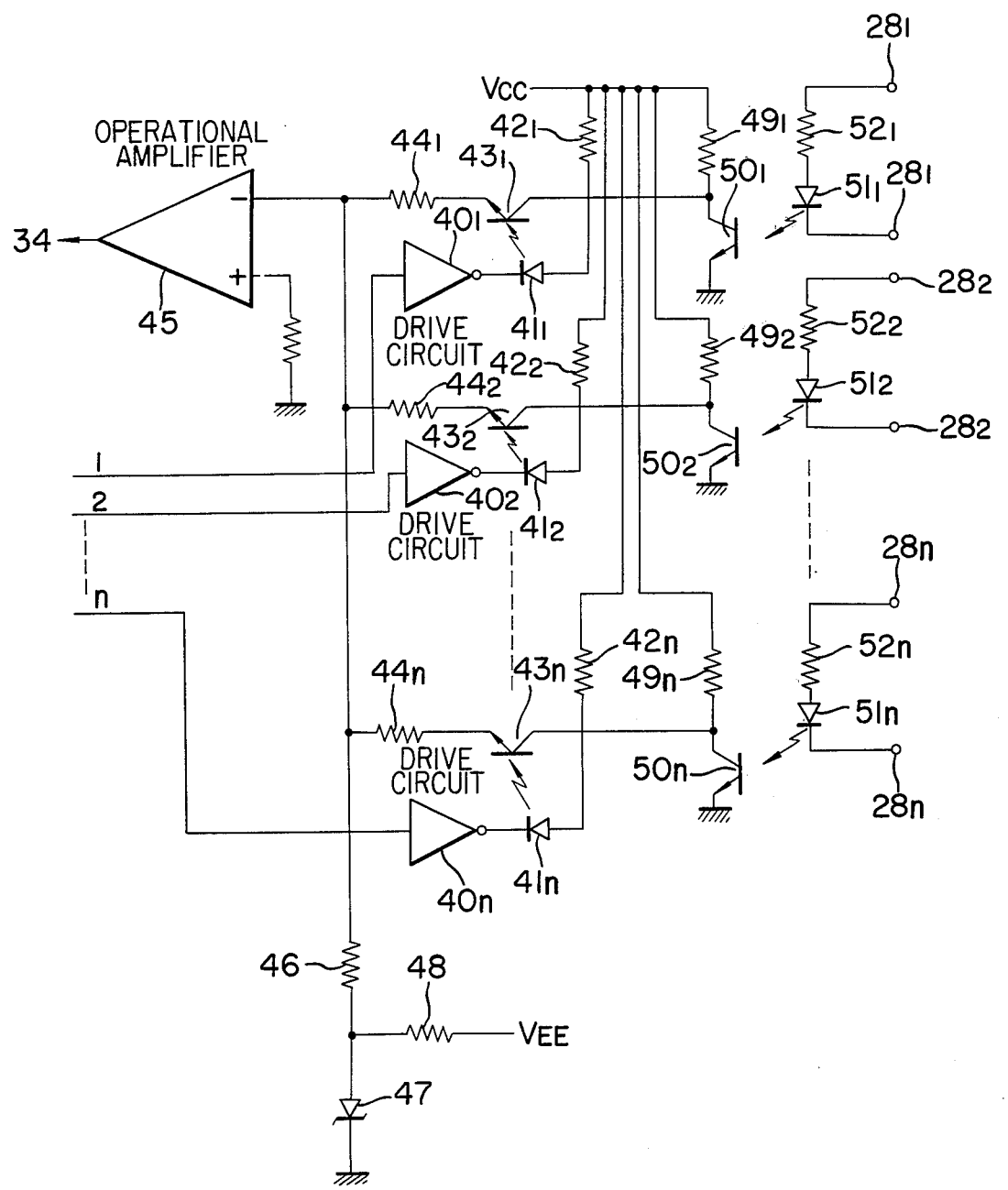
FIG. 7 is a detailed circuit diagram of a detector circuit.

Next referring to FIG. 7, the detector circuit 29 will be described in detail. The output terminals of the shift register 33 (See FIG. 6) are connected to the drive circuits $40_1$–$40_n$ respectively, and the output terminals of the drive circuits $40_1$–$40_n$ are connected through light-emitting diodes $41_1$–$41_n$ in photoisolators and external resistors $42_1$–$42_n$ to a bias source $V_{cc}$ of the monomultivibrator 34. The light emitted from the light-emitting diodes $41_1$–$41_n$ is incident on the bases of phototransistors $43_1$–$43_n$. The emitters of the phototransistors $43_1$–$43_n$ are connected through resistors $44_1$–$44_n$ to the noninverting terminal of an operational amplifier 45 and to a zener diode 47 through a resistor 46. This zener diode 47 is connected through a resistor 48 to a negative power source $V_{EE}$. The inverting or positive terminal + of the operational amplifier is grounded, and the output terminal thereof is connected to the input of the monomultivibrator 34 (See FIG. 6).

The collectors of the phototransistors $43_1$–$43_n$ are connected through resistors $49_1$–$49_n$ to the source $V_{cc}$ and are grounded through phototransistors $50_1$–$50_n$ which receive the light emitted from the corresponding light-emitting diodes $51_1$–$51_n$ in photoisolators. These light-emitting diodes $51_1$–$51_n$ are connected through resistors $52_1$–$52_n$ to the output terminals $28_1$–$28_n$ (See FIG. 5).

The currents flowing through the light-emitting diodes $51_1$–$51_n$ connected to the output terminals $28_1$–$28_n$ vary only depending upon the variation in output voltages across the output terminals $28_1$–$28_n$. In other words, the operations of these light-emitting diodes $51_1$–$51_n$ are not influenced by the operations of other circuits and their elements. Therefore, the voltage across the phototransistor $50_n$ is depending upon the intensity of light emitted from the corresponding light-emitting diode $51_n$. In response to the output from the shift register 33, one of the light-emitting diodes $41_1$–$41_n$ is energized to emit the light so that the corresponding phototransistors $43_n$ is enabled. Then the voltage across the phototransistor $50_n$ is compared with a reference voltage across the zener diode 47, and the difference between them is applied to the operational amplifier 45 as an error signal.

Figure 8:
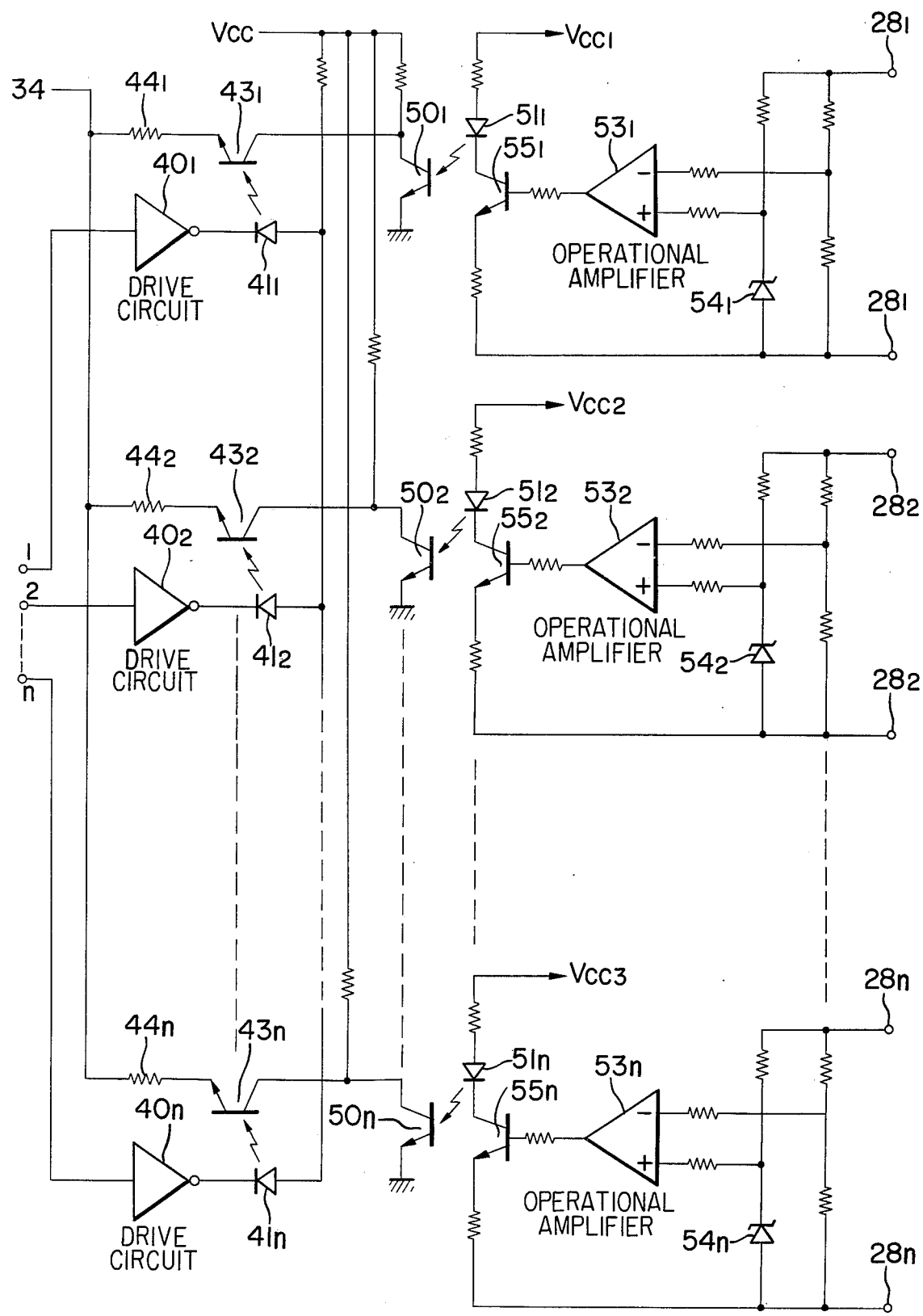
FIG. 8 is a detailed circuit diagram of another embodiment of the detector circuit shown in FIG. 7.

In FIG. 8 there is shown another embodiment of the detector circuit 29. The input terminals of operational amplifiers $53_1$–$53_n$ are connected to the corresponding output terminals $28_1$–$28_n$, and the outputs of the operational amplifiers $53_1$–$53_n$ are connected through resistors to the bases of transistors $55_1$–$55_n$ so that the current flowing through each of these transistors $55_1$–$55_n$ varies depending upon the output from the corresponding operational amplifier $53_n$. Consequently the intensity of light emitted from the corresponding light emitting-diode $51_n$ varies depending upon the current flowing through the corresponding transistor $55_n$. The mode of operation of the detector circuit 29 shown in FIG. 8 is substantially similar to that of the circuit shown in FIG. 7 except that the output from the phototransistor $50_n$ is directly applied to the monomultivibrator 34 (See FIG. 6).

The advantage of the detector circuit 29 shown in FIG. 8 is that since the operational amplifiers $53_1$–$53_n$ and zener diodes $54_1$–$54_n$ are connected to the output terminals $28_1$–$28_n$, the operation is very stable.

Figure 9:
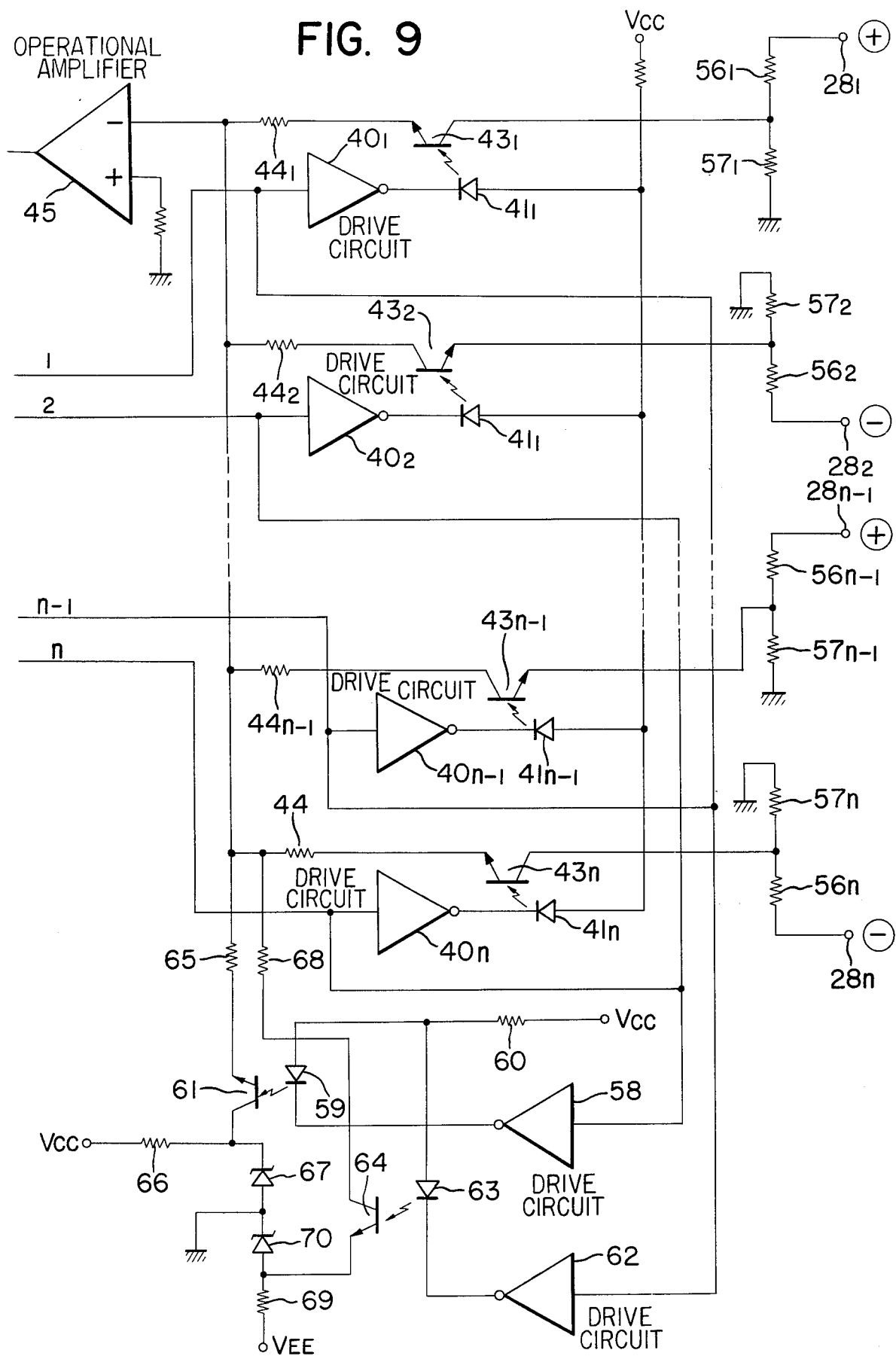
FIG. 9 is a detailed circuit diagram of a further embodiment of the detector shown in FIG. 7.

In FIG. 9 there is shown a further embodiment of the detector circuit 29. The positive voltage is derived from the output terminal $28_1$ while the negative output voltage is derived from the output terminal $28_2$. That is, the positive output voltage is derived from the output terminal $28_{n-1}$ while the negative output voltage, from the output terminal $28_n$ where n=an even integer. The positive terminals $28_1$, $28_3$, ..., and $28_{n-1}$ are connected to the positive terminals of the corresponding output terminals $28_1$–$28_n$ (See FIG. 5) while the negative terminals $28_2$, $28_4$, ..., and $28_n$, to the negative terminals thereof. The output terminals $28_1$–$28_n$ are grounded through resistors $56_1$ and $57_2$–$56_n$ and $57_n$, and the junction between the resistors $56_1$ and $57_1$; $56_3$ and $57_3$; ...; and $56_{n-1}$ and $57_{n-1}$ are connected to the collectors of phototransistors $43_1$, $43_3$, ..., and $43_{n-1}$ while the junctions between the resistors $56_2$ and $57_2$; $56_4$ and $57_4$; ..., and $56_n$ and $57_n$ are connected to the emitters of phototransistors $43_2$, $43_4$, ..., and $43_n$. The even-numbered output terminals of the shift register 33 are connected through a drive circuit 58, a light-emitting diode 59 and a resistor 60 to the bias source $V_{cc}$, and the light emitted from the light-emitting diode 59 is intercepted by a phototransistor 61. The odd-numbered output terminals of the shift register 33 are connected through a drive circuit 62, a light-emitting diode 63 and the resistor 60 to the positive bias source $V_{cc}$, and the light emitted from the light-emitting diode 63 is intercepted by a phototransistor 64. The emitter of the phototransistor 61 is connected through a resistor 65 to the noninverting terminal of the operational amplifier 45 while the collector is connected through a resistor 66 to the positive bias source $V_{cc}$ and is grounded through a zener diode 67. The collector of the phototransistor 64 is connected through a resistor 68 to the noninverting terminal of the operational amplifier 45 while the emitter is connected through a resistor 69 to the negative bias source $V_{EE}$ and is also grounded through a zener diode 70.

The output voltage at each of the positive output terminals $28_1$–$28_{n-1}$ is compared with a negative reference voltage across the zener diode 70 while the negative voltage at each of the positive output terminals $28_2$–$28_n$ is compared with a negative reference voltage across the zener diode 67.

Figure 10:
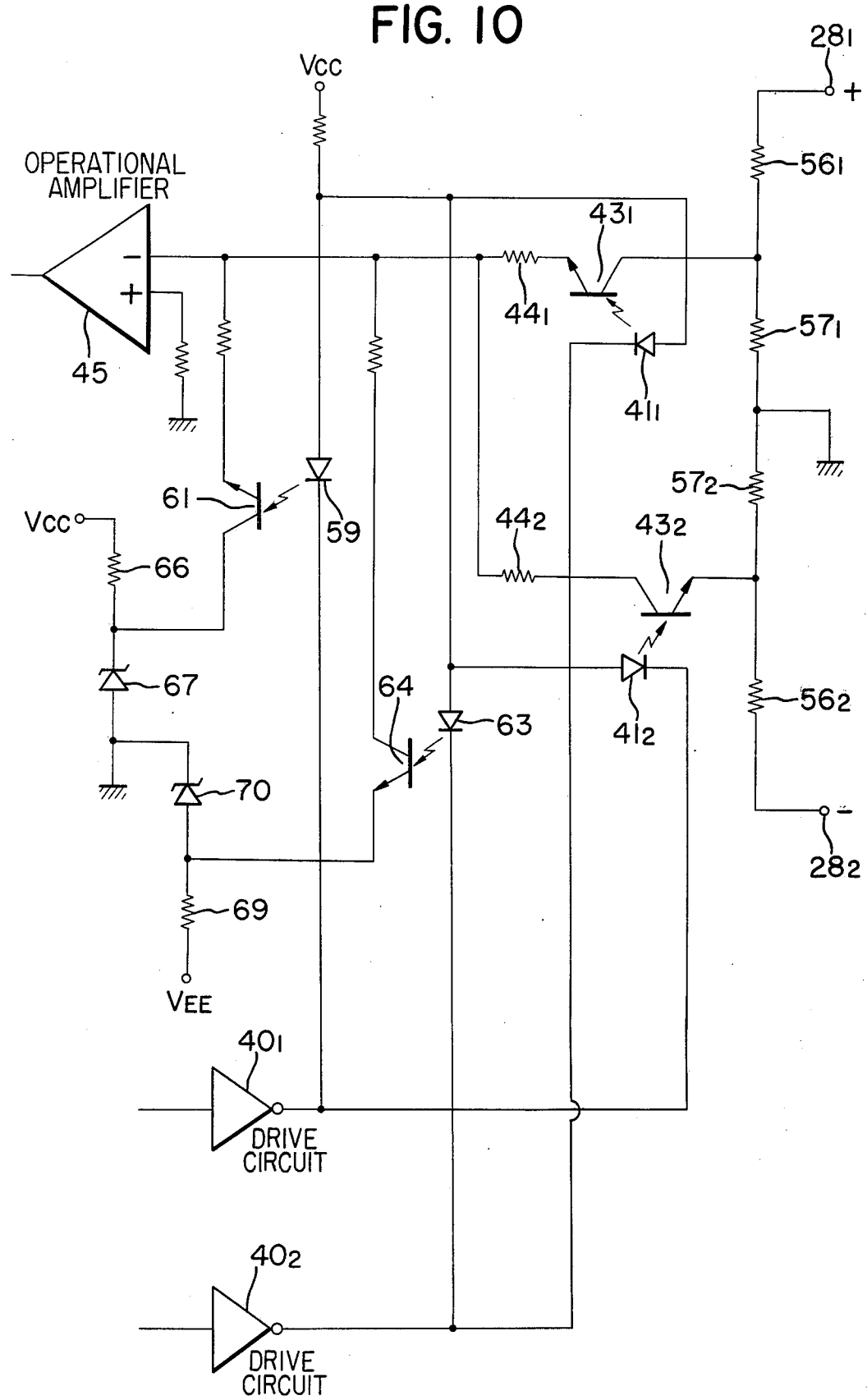
FIG. 10 is a detailed circuit diagram of the simplest version of the detector shown in FIG. 9.
Figure 11:
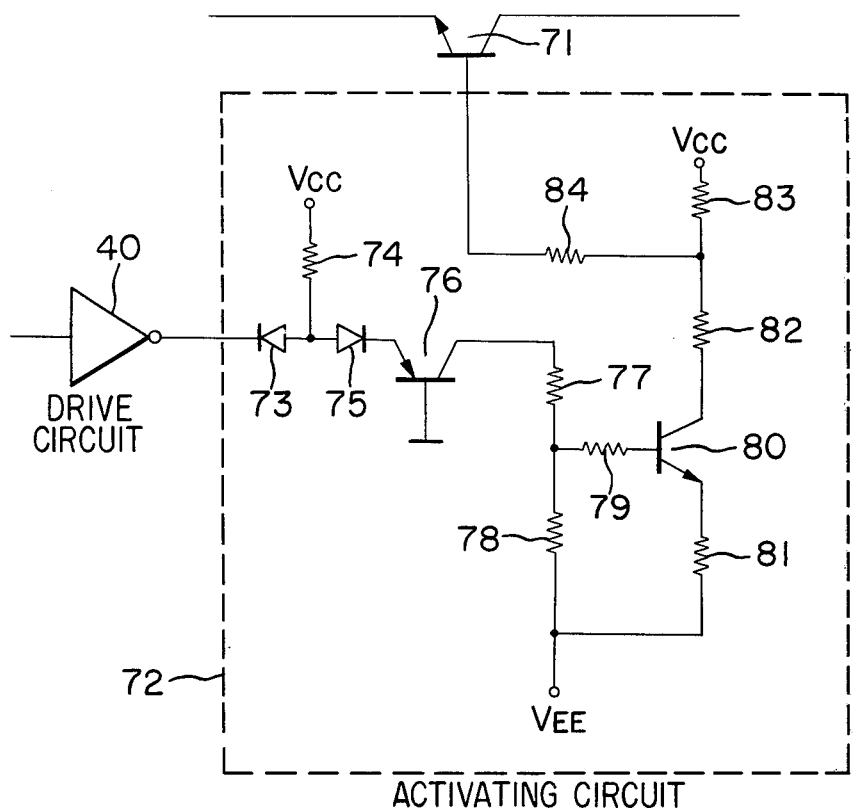
FIG. 11 is a detailed diagram of a modified switching circuit.

In FIG. 10 there is shown the most simplified version of the detector circuit 29 shown in FIG. 9. The positive output terminal $28_1$ is grounded through the resistors $56_1$ and $57_1$ while the negative output terminal $28_2$ is grounded through the resistors $56_2$ and $57_2$. The junction between the resistors $56_1$ and $57_1$ is connected to the collector of the phototransistor $43_1$ while the junction between the resistors $56_2$ and $57_2$, to the emitter of the phototransistor $43_2$. The emitter of the phototransistor $43_1$ is connected through the resistor $44_1$ to the noninverting terminal of the operational amplifier 45 while the collector of the phototransistor $43_2$ is connected through the resistor $44_2$ to the inverting input terminal of the operational amplifier. The emitter of the phototransistor 61 and the collector of the phototransistor 64 are connected to the inverting input terminal of the operational amplifier 45. The emitter of the phototransistor 61 is connected through the resistor 66 to the positive bias source $V_{cc}$ and is grounded through the zener diode 67. The emitter of the phototransistor 64 is connected through the resistor 69 to the negative bias source $V_{EE}$ and is also grounded through the zener diode 70.

One of the two output terminals of the shift register 33 is connected through the drive circuit $40_1$ to the light-emitting diodes 59 and 41 while the other output terminal is connected through the drive circuit $40_2$ to the light-emitting diodes 63 and 41. The positive and negative output voltages are derived from the positive and negative output terminals $28_1$ and $28_2$ respectively, and are compared with the reference voltages respectively, across the zener diodes 67 and 70.

So far each of the conduction or switching circuits has been described as consisting of a light-emitting diode and a phototransistor, but instead an electronic switch such as a transistor or field-effect transistor may be also used. That is, in FIG. 11 there is shown a switching circuit including transistors. Instead of the phototransistor, a transistor 71 is used and its collector and emitter are connected in the manner described in conjunction with the phototransistor. However, its base is connected to an activating circuit generally indicated by the reference numeral 72 and used instead of the light emitting diode. The input terminal of the activating circuit 72 is connected to the driver circuit 40. The input terminal in turn is connected through a diode 73 which in turn is connected through a resistor 74 to the positive bias source $V_{cc}$ and to a diode 75 which in turn is connected to an emitter of a transistor 76. The collector of the transistor 76 is connected through resistors 77 and 78 to the negative bias source $V_{EE}$. The junction between the series-connected resistors 77 and 78 is connected through a resistor 79 to the base of a transistor 86 whose emitter is connected through a resistor 81 to the negative bias source $V_{EE}$ and whose collector is connected through series-connected resistors 82 and 83 to the positive bias source $V_{cc}$. The junction between the resistors 82 and 83 is connected through a resistor 84 to the base of the transistor 71.

Next the mode of operation of this switching circuit will be described. Assume that the output is derived from the output terminal of the shift register 33 and is transmitted to the drive circuit 40. Then, the low level output is derived from the drive circuit 40 so that the current from the bias source $V_{cc}$ flows through the diode 73 but not through the transistor 76 and consequently the transistor 80 is cut off. As a result, the voltage from the source $V_{cc}$ is impressed through the resistor 84 to the base of the transistor 71 so that the latter is enabled. On the other hand when no input is applied to the drive circuit 40, the positive output is derived therefrom so that the transistors 76 and 80 are driven into the conduction state. As a result, no voltage is impressed on the base of the transistor 71 so that the latter is disabled.

Figure 12:
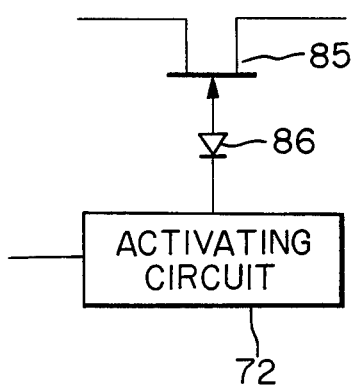
FIG. 12 is a diagram of another modified switching circuit.

In FIG. 12 there is shown a switching circuit employing a field-effect transistor 85 instead of the transistor 71. The mode of operation of this switching circuit is substantially similar to that of the switching circuit described above in conjunction with FIG. 11 except that the gate of the field-effect transistor 85 is connected through a diode 86 to the activating circuit 72.

What is claimed is:

1. A time division switching regulator comprising
   (a) a plurality of inverters electrically connected to a single power source, each inverter having a set of output terminals,
   (b) means coupled to each set of output terminals for rectifying and smoothing the output from the corresponding inverter,
   (c) a common detector circuit for sequentially monitoring the output voltages at said sets of output terminals and comparing said monitored voltages with a predetermined reference voltage to sequentially generate corresponding error signals,
   (d) a common control circuit responsive to said error signals for sequentially controlling the outputs of the corresponding inverters, and
   (e) a shift register for sequentially enabling said inverters.

2. A time division switching regulator as set forth in claim 1, wherein said control circuit comprises a monomultivibrator, a flip-flop, and two AND gates.

3. A time division switching regulator as set forth in claim 1, wherein said detector circuit comprises:
   a plurality of first light-emitting diodes each connected to one set of said output terminals,
   a plurality of first phototransistors each being enabled in response to the light emitted from a corresponding one of said first light-emitting diodes,
   a plurality of second light-emitting diodes each being enabled in response to an output from said shift register,
   a plurality of second phototransistors each being enabled in response to the light emitted from a corresponding one of said second light-emitting diodes,
   a zener diode for generating a reference voltage, and
   an operational amplifier electrically connected to said second phototransistors and said zener diode for generating an error signal representative of the difference between said reference voltage and the monitored output voltage.

4. A time division switching regulator as set forth in claim 1, wherein said detector circuit comprises:
   a plurality of zener diodes each connected to one set of said output terminals,
   a plurality of operational amplifiers each having input terminals connected to one of said zener diodes and a corresponding set of output terminals,
   a plurality of transistors connected to the outputs of respective ones of said operational amplifiers, the current flowing through said transistors being dependent upon the output of the corresponding operational amplifier,
   a plurality of first light-emitting diodes each connected to a corresponding one of said transistors,
   a plurality of first phototransistors each being optically coupled to a corresponding one of said first light-emitting diodes and being enabled in response to the light emitted from the corresponding light-emitting diode,
   a plurality of second light-emitting diodes each being enabled in response to an output from said shift register, and
   a plurality of second phototransistors each being optically coupled to a corresponding one of said second light-emitting diodes and being enabled in response to the light from the corresponding light-emitting diode, the outputs from said second phototransistors being coupled to said control circuit.

5. A time division switching regulator as set forth in claim 1, wherein said detector circuit comprises:
   a plurality of first activating circuits each being connected to one set of said output terminals,
   a plurality of switching elements each connected to a corresponding one of said first activating circuits and each being rendered conductive in response to an output from the corresponding first activating circuit,
   a plurality of second activating circuits enabled in response to the output from said shift register,
   a plurality of second switching elements each being connected to a corresponding one of said second activating circuits and each being enabled in response to the output from the corresponding second activating circuit,
   at least one zener diode for generating a reference voltage, and an operational amplifier electrically connected to said zener diode and said second switching elements for generating an error signal representative of the difference between said reference voltage and the monitored output voltage, the output of said operational amplifier being coupled to said control circuit.

6. A time division switching regulator as set forth in claim 5, wherein said first and second switching elements are transistors.

7. A time division switching regulator as set forth in claim 5, wherein said first and second switching elements are field-effect transistors.

8. A time division switching regulator as set forth in claim 1, wherein said detector circuit comprises:
   a plurality of zener diodes each being connected to a corresponding set of said output terminals,
   a plurality of operational amplifiers each connected to a corresponding set of said output terminals,
   a plurality of transistors each connected to a corresponding one of said operational amplifiers, the current flowing through each of said transistors being dependent on the output of the corresponding operational amplifier,
   a plurality of first activating circuits each connected to a corresponding one of said transistors and each being activated in response to the conduction of the corresponding transistor, a plurality of first switching elements each coupled to a corresponding one of said first activating circuits and being enabled in response to an output of the corresponding first activating circuit, a plurality of second activating circuits each being enabled in response to an output from said shift register, and a plurality of second switching elements each connected to a corresponding one of said second activating circuits and being enabled in response to the output from the corresponding second activating circuit, the outputs from said second switching elements being coupled to said control circuit.

9. A time division switching regulator as set forth in claim 8, wherein said first and second switching elements are transistors.

10. A time division switching regulator as set forth in claim 8 wherein said first and second switching elements are field-effect transistors.

11. A time division switching regulator as set forth in claim 1 wherein said plurality of output terminals comprises a plurality of positive and negative terminals, and said detector circuit comprises a plurality of first phototransistors through which said positive and negative output terminals are connected to an operational amplifier respectively, two second phototransistors through which zener diodes generating positive and negative reference voltages are connected to said operational amplifier, the outputs at said positive and negative output terminals being selectively coupled to said operational amplifier by periodically rendering each of said first phototransistors conductive in response to the output of said shift register, means for coupling said positive reference voltage to said operational amplifier at the time of coupling a positive output terminal to the operational amplifier, means for applying said negative reference voltage to said operational amplifier at the time of coupling a negative output terminal to the operational amplifier, and means for coupling the output of said operational amplifier to said control circuit.

12. A time division switching regulator as set forth in claim 1 wherein said plurality of output terminals comprise positive and negative terminals, and said detector circuit comprises two first phototransistors for selectively coupling said positive and negative output terminals to an operational amplifier respectively, two second phototransistors for selectively coupling two zener diodes for providing positive and negative reference voltages to said operational amplifier, the voltage at a positive output terminal and the positive reference voltage being coupled to said operational amplifier by periodically rendering said first and second phototransistors conductive in response to the output of said shift register, the voltage at a negative output terminal and the negative reference voltage being coupled to said operational amplifier by periodically rendering said first and second phototransistors conductive in response to the output of said shift register, and means for coupling the output of said operational amplifier to said control circuit.

* * * * *

UNITED STATES PATENT AND TRADEMARK OFFICE
CERTIFICATE OF CORRECTION

PATENT NO. : 4,163,906
DATED : August 7, 1979
INVENTOR(S) : Hironori Shimamura

It is certified that error appears in the above—identified patent and that said Letters Patent is hereby corrected as shown below:

On the title page, the name of the Assignee is incorrect.
    The Assignee should be --NEMIC·LAMBDA K.K.--.

Signed and Sealed this

First Day of April 1980

[SEAL]

*Attest:*

SIDNEY A. DIAMOND

*Attesting Officer*  *Commissioner of Patents and Trademarks*